(12) United States Patent
Zennyoji

(10) Patent No.: US 10,525,682 B2
(45) Date of Patent: Jan. 7, 2020

(54) ADHESIVE RESIN COMPOSITIONS AND LAMINATES USING THE SAME

(71) Applicant: RIKEN TECHNOS CORPORATION, Tokyo-to (JP)

(72) Inventor: Yoshihiro Zennyoji, Tokyo-to (JP)

(73) Assignee: RIKEN TECHNOS CORPORATION, Tokyo-To (JP)

(*) Notice: Subject to any disclaimer, the term of this patent is extended or adjusted under 35 U.S.C. 154(b) by 0 days.

(21) Appl. No.: 15/572,527

(22) PCT Filed: May 2, 2016

(86) PCT No.: PCT/JP2016/063556
§ 371 (c)(1),
(2) Date: Nov. 8, 2017

(87) PCT Pub. No.: WO2016/181880
PCT Pub. Date: Nov. 17, 2016

(65) Prior Publication Data
US 2018/0154620 A1    Jun. 7, 2018

(30) Foreign Application Priority Data

May 8, 2015 (JP) .................. 2015-095889

(51) Int. Cl.
| | | |
|---|---|---|
| H01B 7/08 | (2006.01) | |
| B32B 27/32 | (2006.01) | |
| C09J 123/26 | (2006.01) | |
| C09J 7/24 | (2018.01) | |
| B32B 27/38 | (2006.01) | |
| C09J 123/12 | (2006.01) | |
| H01B 3/42 | (2006.01) | |
| H01B 3/44 | (2006.01) | |
| H01B 7/295 | (2006.01) | |

(52) U.S. Cl.
CPC .............. *B32B 27/32* (2013.01); *B32B 27/38* (2013.01); *C09J 7/243* (2018.01); *C09J 123/12* (2013.01); *C09J 123/26* (2013.01); *H01B 3/421* (2013.01); *H01B 3/441* (2013.01); *H01B 3/446* (2013.01); *H01B 3/447* (2013.01); *H01B 7/08* (2013.01); *H01B 7/295* (2013.01); *B32B 2307/3065* (2013.01); *B32B 2307/518* (2013.01); *B32B 2457/00* (2013.01)

(58) Field of Classification Search
CPC . C09J 7/20; C09J 123/08; C09J 123/10; C09J 7/243; C09J 123/12; H01B 7/295; H01B 3/447; H01B 3/446; H01B 3/421; B32B 27/32; B32B 27/38; B32B 27/36; B32B 2307/3065; B32B 2457/00; B32B 2307/518

See application file for complete search history.

(56) References Cited

U.S. PATENT DOCUMENTS

| | | |
|---|---|---|
| 4,058,647 A | 11/1977 | Inoue et al. |
| 5,290,877 A | 3/1994 | Yamaoka et al. |
| 6,703,141 B1 * | 3/2004 | Lu et al. ................ B32B 27/32 |
| | | 428/515 |
| 2013/0296476 A1 | 11/2013 | Yasui et al. |

FOREIGN PATENT DOCUMENTS

| | | |
|---|---|---|
| JP | 55-149341 | 11/1980 |
| JP | 59-159844 | 9/1984 |
| JP | 60-8347 | 1/1985 |
| JP | 61-72041 | 4/1986 |
| JP | 3-181031 | 8/1991 |
| JP | 4-198243 | 7/1992 |
| JP | 2002-313151 | 10/2002 |
| JP | 2006-124510 | 5/2006 |
| JP | 2008-24786 | 2/2008 |
| JP | 2008-251261 | 10/2008 |
| JP | 2013-254703 | 12/2013 |
| WO | 2012/099107 | 7/2012 |

OTHER PUBLICATIONS

International Search Report dated Jul. 26, 2016 in International Application No. PCT/JP2016/063556.
Extended European Search Report dated Nov. 7, 2018 in corresponding European patent application No. 16792605.4.
International Preliminary Report on Patentability dated Nov. 23, 2017 in International Application No. PCT/JP2016/063556.
Office Action dated Mar. 6, 2019 in corresponding Chinese patent application No. 201680026523.0, with English translation.
Office Action dated Mar. 13, 2019 in corresponding Taiwanese patent application No. 105114151, with English translation.

\* cited by examiner

*Primary Examiner* — Nathan M Nutter
(74) *Attorney, Agent, or Firm* — Wenderoth, Lind & Ponack, L.L.P.

(57) ABSTRACT

Provided is adhesive resin compositions comprising (A) 30 to 70% by mass of an acid-modified polypropylene-based resin; (B) 20 to 60% by mass of a polypropylene-based resin; and (C) 2 to 20% by mass of a copolymer of ethylene and one or more kinds of comonomers selected from the group consisting of vinyl acetate, alkyl methacrylate, and alkyl acrylate, with the proviso that the sum of the percentages of the above component (A), the above component (B), and the above component (C) is 100% by mass.

7 Claims, 2 Drawing Sheets

ADHESIVE RESIN COMPOSITIONS AND LAMINATES USING THE SAME

TECHNICAL FIELD

The present invention relates to adhesive resin compositions. The present invention more particularly relates to adhesive resin compositions that exhibit excellent moist heat resistance and can be suitably used for flexible flat cables; and laminates using the adhesive resin composition.

BACKGROUND ART

Flexible flat cables have a structure in which multiple conductors arranged in parallel are sandwiched between and covered with laminates having insulation substrate films and adhesive resin composition layers. Polyester-based resin compositions are, in general, often used as the above adhesive resin compositions.

The flexible flat cable has conventionally been used for wiring electronic apparatuses such as computers, image display devices, cell phones, printers, car navigation systems, and copy machines. In recent years, the flexible flat cable is also becoming utilized for uses and applications in an expected environment of high temperature and high humidity, as exemplified by electronic devices that are installed onto the outside of an automobile such as millimeter wave radars and car-mounted cameras and home electronic appliances that generate steam such as rice cookers, hot water dispensers, and microwave ovens. It turned out, however, that use of the polyester-based resin composition as the adhesive resin composition gave rise to insufficient moist heat resistance and problems may occur when the flexible flat cable is used in an environment of high temperature and high humidity: the laminate may be peeled off from the conductor and the conductor may be become exposed in extreme cases.

In view of this, Patent Document 1 has suggested "a coating material for a flat cable in which a film-shaped substrate, an anchor coat layer, and a heat seal layer are laminated in the order mentioned, the above-mentioned heat seal layer comprising a filler component and a resin component, the above-mentioned filler component comprising a flame retardant as a major component and the above-mentioned resin component comprising a polyester-based resin as a major component and an additive that inhibits hydrolysis of the above-mentioned polyester-based resin, wherein the above-mentioned additive accounts for 0.5 to 10% by mass based on the total amount of the above-mentioned filler component and resin component"; and the adhesion strength to a conductor and the results of a folding storage stability test after the coating material is stored at a temperature of 85° C. and a humidity 85% RH for 500 hours are disclosed. The adhesion strength to a conductor after the storage is, however, not satisfactory and a further improvement has been desired.

Further, in order to conform to higher temperature rating standards or to earn certification for having a higher temperature rating, the step of cross-linking such as cross-linking by electron beam irradiation and aqueous cross-linking has conventionally been required. Yet in these days, it is demanded to conform to the higher temperature rating standard or to earn the certification for having a higher temperature rating without any steps of cross-linking from the aspect of productivity and costs.

PRIOR ART DOCUMENT

Patent Document

[Patent Document 1]: Japanese Patent Application Laid-Open Publication No. 2013-254703

SUMMARY OF THE INVENTION

Problems to be Solved by the Invention

An object of the present invention is to provide adhesive resin compositions that are capable of retaining moist heat resistance, in particular, their adhesive properties to a conductor even when exposed to an environment of high temperature and high humidity for a long period of time and that can conform to higher temperature rating standards or to earn certification for having a higher temperature rating without any steps of cross-linking; and laminates that can be suitably used for flexible flat cables using the adhesive resin composition.

Means for Solving the Problems

The present inventor has intensively studied to discover that a particular adhesive resin composition makes it possible to achieve the above object.

Accordingly, the present invention is an adhesive resin composition comprising:

(A) 20 to 70% by mass of an acid-modified polypropylene-based resin;

(B) 20 to 60% by mass of a polypropylene-based resin; and (C) 2 to 25% by mass of a copolymer of ethylene and one or more kinds of comonomers selected from the group consisting of vinyl acetate, alkyl methacrylate, and alkyl acrylate;

with the proviso that the sum of the percentages of the component (A), the component (B), and the component (C) is 100% by mass.

The second invention is the adhesive resin composition according to the first invention, further comprising 10 to 300 parts by mass of (D) a flame retardant with the sum of the percentages of the above component (A), the above component (B), and the above component (C) being 100 parts by mass.

The third invention is a laminate comprising at least one or more layers formed of the adhesive resin composition according to the first or second invention.

The fourth invention is a laminate comprising: a biaxially oriented polyethylene terephthalate-based resin film; an anchor coat formed of a coating material comprising a silane coupling agent; and a layer formed of the adhesive resin composition according to the first or second invention on one side of the resin film in the order.

The fifth invention is the laminate according to the fourth invention, wherein the silane coupling agent is one or more kinds selected from the group consisting of a silane coupling agent having an amino group and a silane coupling agent having an epoxy group.

The sixth invention is a flexible flat cable comprising the adhesive resin composition according to the first or second invention.

The seventh invention is a flexible flat cable comprising the laminate according to any one of the third to fifth inventions.

Effect of the Invention

The adhesive resin composition according to the present invention exhibits excellent moist heat resistance and is capable of retaining its adhesive properties to a conductor even when exposed to an environment of high temperature and high humidity for a long period of time. In addition, without any steps of cross-linking, the adhesive resin composition of the present invention can conform to higher temperature rating standards or to earn certification for having a higher temperature rating. In a preferred mode of the present invention, the adhesive resin composition of the present invention can earn UL certification for having a temperature rating of 125° C. without any steps of cross-linking. As results, the flexible flat cables using the adhesive resin composition of the present invention can suitably be employed for wiring electronic apparatuses in an expected environment of high temperature and high humidity, as exemplified by electronic devices that are installed onto the outside of an automobile such as millimeter wave radars and car-mounted cameras and home electronic appliances that generate steam such as rice cookers, hot water dispensers, and microwave ovens.

DETAILED DESCRIPTION OF THE INVENTION

1. Adhesive Resin Compositions

Figure 1:
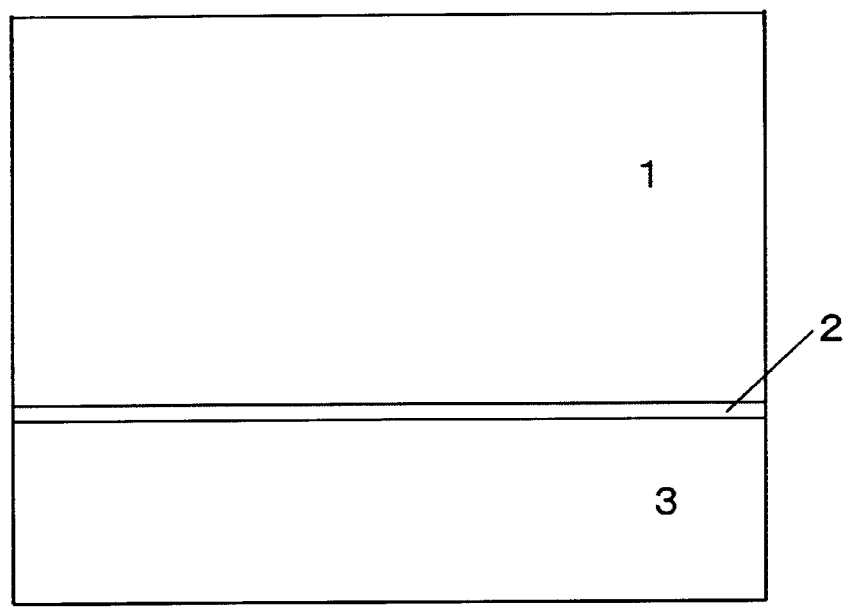
FIG. 1 is a conceptual diagram showing an example of the laminate using the adhesive resin composition of the present invention.
Figure 2:
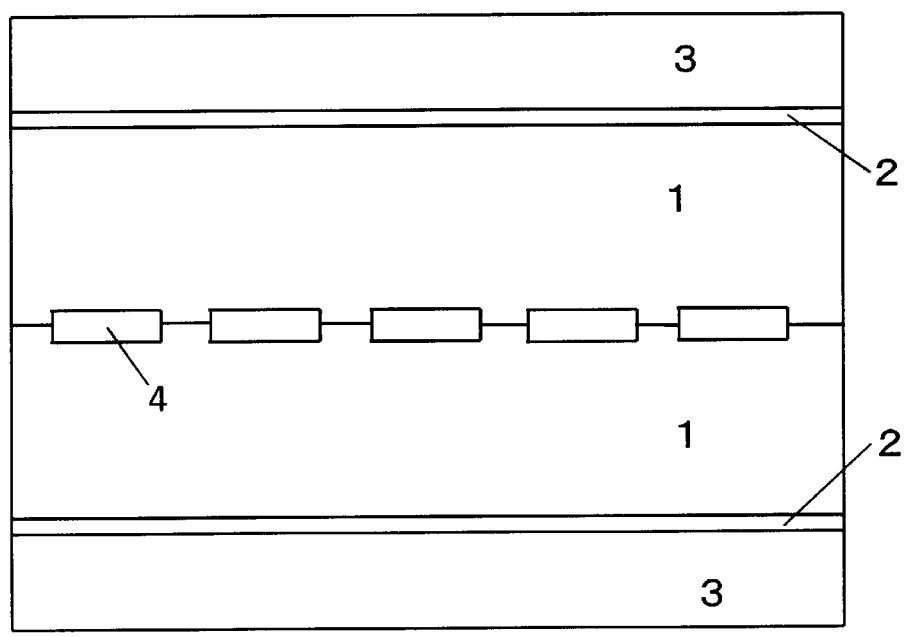
FIG. 2 is a conceptual cross section diagram showing an example of the flexible flat cable using the laminate of the present invention.

The adhesive resin composition of the present invention comprises (A) an acid-modified polypropylene-based resin, (B) a polypropylene-based resin, and (C) an ethylene vinyl acetate copolymer. Preferably, the adhesive resin composition of the present invention further comprises (D) a flame retardant.

(A) Acid-Modified Polypropylene-based Resins:

The above component (A) functions to enable the adhesive resin composition of the present invention to retain its adhesive properties to a conductor, even when exposed it to an environment of high temperature and high humidity for a long period of time.

The above component (A) is a polypropylene-based resin in which an unsaturated carboxylic acid or an unsaturated carboxylic acid derivative is grafted (hereinafter, may be referred to as "acid modified") and is clearly distinguished from the above component (B) in that it is acid modified.

The acid modification amount (the amount of structural units derived from the grafted unsaturated carboxylic acid or the unsaturated carboxylic acid derivative) of the above component (A) depends on the type of the grafted unsaturated carboxylic acid or the unsaturated carboxylic acid derivative; and in the case of maleic anhydride, for example, the acid modification amount is preferably not less than 1% by mole and more preferably not less than 2% by mole from the viewpoint of adhesive properties. On the other hand, the acid modification amount is preferably not more than 10% by mole and more preferably not more than 5% by mole from the viewpoint of film-forming properties.

The melt mass flow rate of the above component (A) (hereinafter, may be abbreviated as MFR-A) which was measured in the conditions of 190° C. and 21.18 N in accordance with JIS K 7210:1999 is preferably not less than 1 g/10 min, more preferably not less than 5 g/10 min, and still more preferably not less than 20 g/10 min from the viewpoint of adhesive properties. On the other hand, MFR-A is preferably not more than 500 g/10 min, more preferably not more than 200 g/10 min, and still more preferably not more than 100 g/10 min from the viewpoint of film-forming properties.

The melting point of the above component (A) is preferably not less than 135° C., more preferably not less than 150° C., still more preferably not less than 160° C. from the viewpoint that conformity to higher temperature rating standards is achieved without any steps of cross-linking. There is no particular upper limit to the melting point and the higher melting point is more preferred; and because the above component (A) is an acid-modified polypropylene-based resin, those usually available will have a melting point of about 168° C. at the highest.

In the present specification, the melting point refers to a peak top melting point in the highest temperature side in the second melting curve measured by a program in which the temperature is kept at 230° C. for five minutes, cooled to −10° C. at a rate of 10° C./min, kept at −10° C. for five minutes, and increased to 230° C. at a rate of 10° C./min by using a Diamond DSC type differential scanning calorimeter from PerkinElmer Japan Co., Ltd. (a melting curve measured in the final temperature increasing step).

The amount of the above component (A) mixed is 20 to 70% by mass and preferably 32 to 45% by mass with the sum of the percentages of the above component (A), the above component (B), and the above component (C) being 100% by mass from the viewpoint of adhesive properties and film-forming properties.

Methods of producing the above component (A) are not particularly restricted; and the above component (A) can be, for example, produced by melt-kneading a resin composition containing 100 parts by mass of (p) a polypropylene-based resin; 0.05 to 5 parts by mass of one or more kinds selected from the group consisting of (q) an unsaturated carboxylic acid and an unsaturated carboxylic acid derivative; and 0.05 to 5 parts by mass of (r) an organic peroxide and allowing the above component (q) to be grafted to the above component (p). The above melt-kneading is carried out preferably at a temperature equal to or higher than the one minute half life temperature of the component (r) for not less than one minute and more preferably at a temperature equal to or higher than the one minute half life temperature of the component (r) for not less than two minutes from the viewpoint that the component (q) and the component (r) completely react and so as not to remain unreacted in the thus produced component (A).

Examples of the above polypropylene-based resin can include propylene homopolymers; and copolymers (including block copolymers and random copolymers) of propylene with a small amount of an α-olefin (for example, ethylene, 1-butene, 1-hexene, 1-octene, 4-methyl-1-pentene, and the like). The melting point of the above component (p) is preferably 135° C., more preferably not less than 150° C., still more preferably not less than 160° C. from the viewpoint that conformity to higher temperature rating standards is achieved without any steps of cross-linking. There is no particular upper limit to the melting point and the higher melting point is more preferred; and because the above component (p) is a polypropylene-based resin, those usually available will have a melting point of about 167° C. at the highest. The definition of the melting point and the method for measurement thereof have been described above. Examples of such a polypropylene-based resin can include highly stereoregular propylene homopolymers (the isotactic pentad fraction is usually not less than 96% by mole and preferably not less than 98% by mole). One kind of those or a mixture of two or more kinds of those can be used as the above component (p).

Examples of the above unsaturated carboxylic acid can include maleic acid, itaconic acid, fumaric acid, acrylic acid, and methacrylic acid. Examples of the above unsaturated carboxylic acid derivative can include maleate monoester, maleate diester, maleic anhydride, itaconate monoester, itaconate diester, itaconic anhydride, fumarate monoester, fumarate diester, fumaric anhydride, alkyl acrylates such as methyl acrylate, and alkyl methacrylates such as methyl methacrylate. Maleic anhydride is preferred as the above component (q) from the viewpoint of adhesive properties. One kind of those or a mixture of two or more kinds of those can be used as the above component (q).

The amount of the above component (q) mixed is not less than 0.05 parts by mass, preferably not less than 0.2 parts by mass, and more preferably not less than 0.5 parts by mass based on 100 parts by mass of the above (p) polypropylene-based resin from the viewpoint of adhesive properties. In addition, the amount of the above component (q) mixed is not more than 5 parts by mass, preferably not more than 4 parts by mass, and more preferably not more than parts by mass from the viewpoint of preventing the component (q) from remaining unreacted in the above produced component (A) at the time of acid modification.

Examples of the above organic peroxide can include dicumyl peroxide, di-tert-butyl peroxide, 2,5-dimethyl-2,5-di-(tert-butylperoxyl)hexane, 2,5-dimethyl-2,5-di(tert-butylperoxyl)hexyne-3,1,3-bis(tert-butylperoxyl isopropyl) benzene, 1,1-bis(tert-butylperoxyl)-3,3,5-trimethyl cyclohexane, n-butyl-4,4-bis(tert-butylperoxyl)valerate, benzoyl peroxide, p-chlorobenzoyl peroxide, 2,4-dichlorobenzoyl peroxide, tert-butyl peroxylbenzoate, tert-butylperoxyl isopropyl carbonate, diacetyl peroxide, lauroyl peroxide, and tert-butylcumylperoxide. From the viewpoint of adhesive properties, 2,5-dimethyl-2,5-di-(tert-butylperoxyl) hexane and 2,5-dimethyl-2,5-di-(tert-butylperoxyl)hexyne-3 are preferred as the above component (r). One kind of those or a mixture of two or more kinds of those can be used as the above component (r).

The amount of the above component (r) mixed is not less than 0.05 parts by mass, preferably not less than 0.2 parts by mass, and more preferably not less than 0.5 parts by mass based on 100 parts by mass of the above (p) polypropylene-based resin from the viewpoint of adhesive properties. In addition, the amount of the above component (r) mixed is not more than 5 parts by mass, preferably not more than 4 parts by mass, and more preferably not more than 3 parts by mass from the viewpoint of controlling a decrease in melt viscosity.

(B) Polypropylene-Based Resins:

The above component (B) functions to improve the film-forming properties of the adhesive resin composition of the present invention.

The amount of the above component (B) mixed is 20 to 60% by mass, preferably 45 to 58% by mass with the sum of the percentages of the above component (A), the above component (B), and the above component (C) being 100% by mass from the viewpoint of adhesive properties and film-forming properties.

Examples of the above component (B) can include propylene homopolymers; and copolymers (including block copolymers and random copolymers) of propylene with a small amount of an α-olefin (for example, ethylene, 1-butene, 1-hexene, 1-octene, 4-methyl-1-pentene, and the like). One kind of those or a mixture of two or more kinds of those can be used as the above component (B).

The melt mass flow rate of the above component (B) (hereinafter, may be abbreviated as MFR-B) which was measured in the conditions of 230° C. and 21.18 N in accordance with JIS K 7210:1999 is preferably not less than 5 g/10 min and more preferably not less than 10 g/10 min from the viewpoint of film-forming properties. On the other hand, MFR-B is preferably not more than 30 g/10 min and more preferably not more than 20 g/10 min from the viewpoint of controlling a decrease in melt viscosity.

The melting point of the above component (B) is preferably not less than 135° C., more preferably not less than 150° C., and still more preferably not less than 160° C. from the viewpoint that conformity to higher temperature rating standards is achieved without any steps of cross-linking. There is no particular upper limit to the melting point and the higher melting point is more preferred; and because the above component (B) is a polypropylene-based resin, those usually available will have a melting point of about 167° C. at the highest. The definition of the melting point and the method for measurement thereof have been described above.

(C) Copolymers of Ethylene with One or More Kinds of Comonomers Selected from the Group Consisting of Vinyl Acetate, Alkyl Methacrylate, and Alkyl Acrylate:

The above component (C) is a copolymer of ethylene with one or more kinds of comonomers selected from the group consisting of vinyl acetate; alkyl methacrylates such as methyl methacrylate, ethyl methacrylate, and butyl methacrylate; and alkyl acrylates such as methyl acrylate, ethyl acrylate, and butyl acrylate.

The above component (C) functions to enable the adhesive resin composition of the present invention to retain its adhesive properties to a conductor even when exposed to an environment of high temperature and high humidity for a long period of time and, at the same time, to include the above component (D) flame retardant. In addition, the above comonomer has a —COO structure and brings about a decarboxylation reaction (a decarboxylation reaction) at the time of combustion to function to aid flame retardance.

Of those, copolymers of ethylene with vinyl acetate are preferred from the viewpoint of adhesive properties. One kind of those or a mixture of two or more kinds of those can be used as the above component (C).

The amount of the above component (C) mixed is not less than 2% by mass, preferably not less than 5% by mass, more preferably not less than 7% by mass with the sum of the percentages of the above component (A), the above component (B), and the above component (C) being 100% by mass from the viewpoint of including the above component (D). On the other hand, the amount of the above component (C) mixed is not more than 25% by mass, preferably not more than 16% by mass, and more preferably not more than 12% by mass from the viewpoint that conformity to higher temperature rating standards is achieved without any steps of cross-linking.

The content of structure units derived from the above comonomer of the above component (C) (hereinafter, may be shortened to "the content of comonomers") is preferably not less than 10% by mass, more preferably not less than 20% by mass, and still more preferably not less than 25% by mass from the viewpoint of adhesive properties to a conductor. On the other hand, the content is preferably not more than 85% by mass from the viewpoint of thermal resistance.

The melt mass flow rate of the above component (C) (hereinafter, may be abbreviated as MFR-C) which was measured in the conditions of 190° C. and 21.18 N in accordance with JIS K 7210:1999 is preferably not less than 0.1 g/10 min and more preferably not less than 1 g/10 min from the viewpoint of film-forming properties.
MFR-C is still more preferably not less than 3 g/10 min and most preferably not less than 5 g/10 min from the viewpoint of attaining adhesion strength to a conductor at lower lamination temperatures. On the other hand, MFR-C is preferably not more than 30 g/10 min and more preferably not more than 20 g/10 min from the viewpoint of controlling a decrease in melt viscosity.
(D) Flame Retardants:

In cases where the adhesive resin composition of the present invention is utilized for uses and applications that require flame retardance such as flexible flat cables, the above component (D) is preferably additionally included.

The above component (D) is not particularly restricted; and what can be used is freely-selected flame retardants and preferably flame retardants that are commonly used in polyolefin resins and resin compositions thereof.

Examples of the above component (D) can include antimony-based flame retardants, halogenated flame retardants, metal hydroxides, zinc-based flame retardants, phosphorus-based flame retardants, and nitrogen-containing compound-based flame retardants.

Examples of the above antimony-based flame retardant can include diantimony trioxide, diantimony pentoxide, antimony trichloride, antimony borate, and antimony molybdate.

Examples of the above halogenated flame retardant can include brominated flame retardants such as 1,2-bis(pentabromophenyl)ethane, pentabromodiphenyl ether, octabromodiphenyl ether, decabromnodiphenyl ether, tetrabromobisphenol A, hexabromocyclododecane, bis(tetrabromophthalimide)ethane, poly(dibromopropyl ether), tetrabromobisphenol A carbonate oligomer, tetrabromobisphenol epoxy oligomer, tetrabromobisphenol A-bis(dibromopropyl ether), brominated polystyrene, and hexabromobenzene; and chlorinated flame retardants such as chlorinated paraffin, chlorinated polyphenyl, and perchloro pentacyclodecane.

Examples of the above metal hydroxide can include aluminum hydroxide and magnesium hydroxide.

Examples of the above zinc-based flame retardant can include zinc stannate and zinc borate.

Examples of the above phosphorus-based flame retardant can include phosphate ester-based flame retardants such as trimethyl phosphate, triethyl phosphate, tributyl phosphate, triphenyl phosphate, tributoxyethyl phosphate, tricresyl phosphate, trineopentyl phosphate, tri(2-ethylhexyl)phosphate, tri(butylphenyl)phosphate, tri(isopropylphenyl)phosphate, triphenyl phosphate, trixylenyl phosphate, and t-butyldiphenyl phosphate; condensed phosphate ester-basedflame retardants having, as a major component, a compound in which two molecules or three or more molecules of one kind or two or more kinds of phosphate esters are condensed; compounds in which one or two or more hydrogen atoms of phosphate esters or condensed phosphate ester are substituted by bromine atoms, for example, brominated phosphate ester-based flame retardants such as tris(tribromoneopentyl)phosphate; compounds in which one or two or more hydrogen atoms of phosphate esters or condensed phosphate ester are substituted by chlorine atoms, for example, chlorinated phosphate ester-based flame retardants such as tris(2,3-d ichloropropyl)phosphate; ammonium polyphosphate-based flame retardants; and inorganic phosphorus-based flame retardants such as red phosphorus.

Examples of the above nitrogen-containing compound-based flame retardant can include cyanurate-based flame retardants such as melamine cyanurate, tris(2-hydroxyethyl) isocyanu rate, and tris (2,3-epoxypropyl)isocyanurate; triazine-based flame retardants; and guanidine-based flame retardants.

One or more kinds of those can be used as the above component (D).

The amount of the above component (D) mixed is usually not less than 10 parts by mass and preferably not less than 30 parts by mass with the sum of the parts by mass of the above component (A), the above component (B), and the above component (C) being 100 parts by mass from the viewpoint of flame retardance. In addition, the amount of the above component (D) mixed is usually not more than 300 parts by mass and preferably not more than 250 parts by mass from the viewpoint of flexibility and flex resistance.

The adhesive resin composition of the present invention can be allowed to, if desired, further contain components other than the above components (A) to (D), for example, thermoplastic resins other than the above components (A) to (C); pigments, inorganic fillers, organic fillers, resin fillers; and additives such as lubricants, antioxidants, weatherproof stabilizers, heat stabilizers, mold releasing agents, antistatic agents, and surfactants to the extent of not interfering with the object of the present invention.

The adhesive resin composition of the present invention can be obtained by melt kneading the above components (A) to (C) and freely-selected components that are, if desired, employed such as the above component (D) by using a freely-selected melt kneader. Examples of the above melt kneader can include a batch kneader such as a pressurizing kneader and a mixer; an extrusion kneader such as a single screw extruder, a co-rotating twin screw extruder, and a counter rotating twin screw extruder; and a kneader with a calendar roll. These may be optionally used in any combination. The obtained adhesive resin composition can be pelletized by a freely-selected method. The above pelletization can be carried out by using a method such as hot cut, strand cut, and underwater cut.

2. Laminates:

The laminate of the present invention comprises at least one or more layers comprising the adhesive resin composition of the present invention. The laminate of the present invention preferably has, in the order mentioned, an anchor coat layer comprising a coating material containing a silane coupling agent and a layer comprising the adhesive resin composition of the present invention on one side of a biaxially oriented polyethylene terephthalate-based resin film.

The laminate of the present invention can be obtained by, for example, forming a layer comprising the adhesive resin composition of the present invention directly or via an anchor coat layer on one side of a freely-selected resin film.

The laminate of the present invention can be obtained by, for example, a method comprising co-extruding a freely-selected raw material resin of a resin film and the adhesive resin composition of the present invention using a freely-selected co-extrusion apparatus; a method comprising obtaining each film by using a freely-selected film forming apparatus and subjecting both films to dry lamination or thermal lamination; and an extrusion lamination method comprising subjecting the adhesive resin composition of the present invention to melt extrusion with a freely-selected resin film as a substrate; and the like.

Examples of the above resin film can include films of polyvinyl chloride-based resins such as polyvinyl chloride and vinyl chloride-vinyl acetate copolymers; polyester-based resin such as aromatic polyesters and aliphatic polyesters; polyolefin resins such as polyethylene, polypropylene, and polymethylpentene; styrenic resins such as polystyrene, acrylonitrile-butadiene-styrene copolymer resins (ABS resins), styrene-ethylene-butadiene-styrene copolymers, styrene-ethylene-propylene-styrene copolymers, and styrene-ethylene-ethylene-propylene-styrene copolymers; acrylic resins such as poly(methyl methacrylate); polycarbonate-based resins; cellulose-based resins such as cellophane, triacetylcellulose, diacetylcellulose, and cellulose acetate butyrate; polyvinylidene chloride-based resins; fluorine-containing resins such as polyvinylidene fluoride; in addition, resins such as polyvinyl alcohol, ethylene vinyl alcohol, polyether ether ketone, nylon, polyamide, polyimide, polyurethane, polyetherimide, polysulfone, and polyethersulfone; resin mixtures of one kind or two or more kinds of these, and resin compositions thereof. These films include cast films, uniaxially oriented films, and biaxially oriented films. Further, these films include laminate films in which one or more kinds of these films are laminated in two or more layers.

Of those, those with high thermal resistance, for example, biaxially oriented polyethylene terephthalate-based resin films, biaxially oriented polyethylene naphthalate-based resin films, biaxially oriented polypropylene-based resin films, polyphenylenesulfide-based resin films, polyimide-based resin films, amide-based resin films, and polyethersulfone-based resin films are preferred as the above resin film.

Known materials such as polyester, acryl, polyurethane, acryl urethane, and polyesterurethane can be used as the above coating material for forming an anchor coat layer. Coating materials containing a silane coupling agent can also be used.

The above coating material containing a silane coupling agent is a coating material that mainly contains a silane coupling agent (usually not less than 50% by mass, preferably not less than 75% by mass, more preferably not less than 90% by mass as the solid content).

The above silane coupling agent is a silane compound having at least two different kinds of reactive groups of hydrolysable groups (for example, alkoxy groups such as a methoxy group and an ethoxy group; acyloxy groups such as an acetoxy group; halogen groups such as chloro group; and the like) and organic functional groups (for example, an amino group, a vinyl group, an epoxy group, a methacryloxy group, an acryloxy group, an isocyanate group, and the like). Of these, silane coupling agents having an amino group and silane coupling agents having an epoxy group are preferred from the viewpoint of improving adhesive strength to a layer comprising the adhesive resin composition of the present invention.

Examples of the silane coupling agent having an amino group can include N-2-(aminoethyl)-3-aminopropylmethyl dimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-triethoxysilyl-N-(1,3-dimethyl-butylidene)propyl amine, N-phenyl-3-aminopropyl trimethoxysilane, and N-(vinylbenzyl)-2-aminoethyl-3-anninopropyl trimethoxysilane. One kind of these or a mixture of two or more kinds of these can be used as the silane coupling agent having an amino group.

Examples of the silane coupling agent having an epoxy group can include 2-(3,4-epoxycyclohexyl)ethyltrimethoxysilane, 3-glycidoxypropylmethyldimethoxysilane, 3-glycidoxypropyltrimethoxysilane, 3-glycidoxypropyimethyldiethoxysilane, and 3-glycidoxypropyltriethoxysilane. One kind of these or a mixture of two or more kinds of these can be used as the silane coupling agent having an epoxy group.

Methods for forming an anchor coat using the above coating material for forming an above anchor coat layer are not restricted; and known web coating methods can be used. Specific example thereof can include methods such as roll coating, gravure coating, reverse coating, roller brush coating, spray coating, air knife coating, and die coating. In these cases, a freely-selected diluting solvent, for example, methanol, ethanol, 1-methoxy-2-propanol, n-butyl acetate, toluene, methyl ethyl ketone, methyl isobutyl ketone, ethyl acetate, acetone, and the like can be used as needed.

In addition, the above coating material for forming an anchor coat layer may be allowed to contain one kind or two or more kinds of additives such as antioxidants, weatherproof stabilizers, light fastness stabilizers, ultraviolet absorbents, heat stabilizers, antistatic agents, surfactants, coloring agents, infrared shielding agents, leveling agent, thixotropic additives, and fillers to the extent of not interfering with the object of the present invention.

The dry thickness of the anchor coat layer is usually about 0.01 to 5 μm and preferably 0.03 to 1 μm.

3. Flexible flat cables:

The flexible flat cable of the present invention comprises the adhesive resin composition of the present invention and the laminate of the present invention.

The flexible flat cable of the present invention can be obtained by, for example, using two rolls of the laminate of the present invention which has, in the order mentioned, an anchor coat layer comprising a coating material containing a silane coupling agent and a layer comprising the adhesive resin composition of the present invention on one side of a biaxially oriented polyethylene terephthalate-based resin film to sandwich about 1 to 30 conductors such as annealed copper wires, tin plated annealed copper wires, and nickel plated annealed copper wires with a width of 0.6 to 1.7 mm and a thickness of 0.035 to 2 mm, the conductors being arranged in parallel, between the adhesive resin composition layer of one of the above laminates and the adhesive resin composition layer of the other of the above laminates and pressing the resultant with a pressure roll preheated to a temperature of 130 to 200° C. and a backing roll preheated to a temperature of 130 to 200° C.

EXAMPLES

Hereinafter, the present invention is described with reference to Examples, but the present invention is not limited thereto.

Methods for Measurement (a) Film-Forming Properties:

A film with a thickness of 50 μm was formed by using a film forming apparatus equipped with a 700 mm wide T die, an extruder, and a winder with a nip system under the conditions of a die outlet resin temperature of 210° C. The thickness of the obtained film was measured at five points every 50 m in the machine direction with a total of 25 points, which five points include the center in the width direction of the film, 50 mm right of the center, 100 mm right of the center, 50 mm left of the center, and 100 mm left of the center, the machine direction and evaluated according to the following criteria. It is to be noted that as for ones unable to from a film, the following evaluation was omitted.

⊙: Variation in the thickness is not more than ±5%.

○: Variation in the thickness is more than ±5% but not more than ±10%.

Δ: Variation in the thickness is more than ±10%.

×: The film formation was not feasible.

(b) Adhesion Force 1 (Adhesion Force to a Conductor):

A specimen with a width of 50 mm and a length of 150 mm was prepared by cutting out a laminate such that the machine direction is the length direction. On its adhesive resin composition layer, a conductor of a tin plated annealed copper wire with a width of 0.7 mm and a thickness of 0.035 mm was placed such that the length direction of the copper wire is the same as the length direction of the above specimen. The resultant was sandwiched with a metal plate and a silicone rubber sheet, which had been preheated to 190° C. in such a way that the above copper wire side faced the above silicone rubber sheet side and pressed under the conditions of a pressure of 0.3 MPa and a period of time of eight seconds using a press apparatus. The adhesive strength between the above specimen of the sample obtained above and the above copper wire was measured by performing 180-degree peel under the conditions of a test speed of 100 mm/min.

(c) Adhesion force 2 (Adhesion Force to a Conductor After Being Subjected to Moist Heat):

A sample obtained in the same manner as described in the above test (b) was treated in a thermo-humidistat that was set at a temperature of 85° C. and a relative humidity of 85% for 1000 hours; and the adhesive strength between the above specimen and the above copper wire was then measured in the same manner as described in the above test (b).

(d) Adhesion Force 3 (Adhesion Force with Conductors After Resisting to the Heat):

A sample obtained in the same manner as described in the above test (b) was placed in a Geer oven that was set at a temperature of 151° C. and treated for 168 hours; and then the adhesive strength between the above specimen and the above copper wire was measured in the same manner as described in the above test (b).

(e) Adhesion Force 4 (Adhesion Force Between Adhesives):

Specimens with a width of 50 mm and a length of 150 mm were prepared by cutting out a laminate such that the machine direction was the length direction. The specimens were stacked facing their adhesive resin composition layer each other and pressed using a metal plate and a silicone rubber sheet, which had been preheated to 190° C., at a pressure of 0.3 MPa for two seconds. The adhesive strength of the sample obtained above was measured by performing T-type peel under the conditions of a test speed of 100 mm/min. It is to be noted that the term "material failure" in the table means that the biaxially oriented polyethylene terephthalate-based resin film in the laminate broken. The term "PET" means that peeling occurred at the interface between the biaxially oriented polyethylene terephthalate-based resin film layer and the adhesive resin composition layer.

(f) Adhesion Force 5 (Adhesion Force Between Adhesives After Being Subjected to Moist Heat):

A sample obtained in the same manner as described in the above test (e) was treated in a thermo-humidistat that was set at a temperature of 85° C. and a relative humidity of 85% for 1000 hours; and the adhesive strength was then measured in the same manner as described in the above test (e).

(g) Adhesion Force 6 (Adhesion Force Between Adhesives After Resisting to the Heat):

A sample obtained in the same manner as described in the above test (e) was placed in a Geer oven that was set at a temperature of 151° C. and treated for 168 hours; and the adhesive strength was then measured in the same manner as described in the above test (e).

(h) Flame Retardance:

A flexible flat cable with a width of 25 mm was obtained by using two rolls of laminate to a conductor with eight tin plated annealed copper wires arranged in parallel, each of which wire has a width of 0.7 mm and a thickness of 0.035 mm between the adhesive resin composition layer of one of the above laminates and the adhesive resin composition layer of the other of the above laminates and pressing the resultant with a pressure roll preheated to a temperature of 190° C. and a backing roll preheated to a temperature of 190° C. by using a flexible flat cable apparatus. The obtained flexible flat cable was evaluated in accordance with UL1581 1080 VW-1 Flame test.

(i) Thermal Resistance:

A specimen with a length of 15 cm was taken out from a flexible flat cable obtained in the same manner as described in the above test (h), which was folded into a winding zigzag shape (folded like a Z letter) with a one side length of 5 cm in a direction perpendicular to the longitudinal direction of the tin plated annealed copper wire and clipped at the folds to be subjected to the test.

The specimen obtained above was placed in a Geer oven to be treated at a temperature of 151° C. for 168 hours; and the above specimen was then subjected to visual observation and evaluated according to the following criteria.

○: No interfacial peeling is observed. No cohesive failure of the adhesive is observed either.

Δ: No interfacial peeling was observed; but cohesive failure was observed in some of the adhesives.

×: Interfacial peeling was observed at any of the interlayers.

(j) Moist Heat Resistance:

A specimen obtained in the same manner as described in the above test (i) was treated in a thermo-humidistat that was set at a temperature of 85° C. and a relative humidity of 85% for 1000 hours; and the above specimen was then subjected to visual observation and evaluated according to the following criteria.

○: No interfacial peeling is observed. No cohesive failure of the adhesive is observed either.

Δ: No interfacial peeling was observed; but cohesive failure was observed in some of the adhesives.

×: Interfacial peeling was observed at any of the interlayers.

(k) Heat Cycle Resistance:

A specimen obtained in the same manner as described in the above test (i) was, in an thermostatic chamber, subjected to 500 cycles, each of which cycle comprised treatment at a temperature of −40° C. for 30 minutes, increasing the temperature to 125° C., treatment at that temperature for 30 minutes, and decreasing the temperature to −40° C.; and then the above specimen was subjected to visual observation and evaluated according to the following criteria.

○: No interfacial peeling is observed. No cohesive failure of the adhesive is observed either.

Δ: No interfacial peeling was observed; but cohesive failure was observed in some of the adhesives.

×: Interfacial peeling was observed at any of the interlayers.

(l) Cold Resistance:

A flexible flat cable obtained in the same manner as described in the above test (h) was left to stand in a thermostatic test room that was set at −40° C. for 24 hours and was folded in half such that the room such that the fold is along the machine direction of the cable; and the above specimen was subjected to visual observation. Similarly, the flexible flat cable was folded in half such that the room such that the fold is along the width direction of the cable; and the above specimen was subjected to visual observation. The evaluation was carried out according to the following criteria.

◯: In both cases, no interfacial peeling is observed. No cohesive failure of the adhesive is observed either.

Δ: In both cases, no interfacial peeling is observed; but in at least either one of the cases, cohesive failure was observed in some of the adhesives.

×: In at least either of the cases, interfacial peeling was observed at any of the interlayers.

Raw Materials Used
(A) Acid-Modified Polypropylene Resins:
(A-1) A maleic anhydride-modified polypropylene resin, acid modification amount 2% by mole, MFR-A 40 g/10 min, melting point 168° C.
(A-2) A maleic anhydride-modified polypropylene resin "Umex 1001 (trade name)" from Sanyo Chemical Industries, Ltd., acid modification amount 1.7% by mole, MFR-A 130 g/10 min, melting point 154° C.
(A-3) An acid-modified polypropylene-based resin "Fusabond P353 (trade name)" from Du Pont, acid modification amount 0.8% by mole, MFR-A 23 g/10 min, melting point 136° C.
(B) Polypropylene-Based Resins:
(B-1) A polypropylene-based resin "Prime Polypro F227D (trade name)" from Prime Polymer Co., Ltd., MFR-B 7 g/10 min, melting point 142° C.
(C) Ethylene Vinyl Acetate Copolymers and the Like:
(C-1) An ethylene vinyl acetate copolymer "Evaflex EV260 (trade name)" from Du Pont-Mitsui Polychemicals Co., Ltd., MFR-C 6.0 g/10 min, content of comonomer 28% by mass
(C-2) An ethylene vinyl acetate copolymer "Evaflex EV180 (trade name)" from Du Pont-Mitsui Polychemicals Co., Ltd., MFR-C 0.2 g/10 min, content of comonomer 33% by mass
(C-3) An ethylene vinyl acetate copolymer "Evaflex EV40LX (trade name)" from Du Pont-Mitsui Polychemicals Co., Ltd., MFR-C 2.0 g/10 min, content of comonomer 41% by mass
(C-4) An ethylene ethyl acrylate copolymer "Elvaloy 2615 (trade name)" from Du Pont-Mitsui Polychemicals Co., Ltd., MFR-C 9.0 g/10 min, content of comonomer 15% by mass
(C-5) An ethylene methyl methacrylate copolymer "Nucrel N0903 (trade name)" from Du Pont-Mitsui Polychemicals Co., Ltd., MFR-C 3.0 g/10 min, content of comonomer 9% by mass
(D) Flame Retardants:
(D-1) A brominated flame retardant "SAYTEX 8010 (trade name)" from Albemarle
(D-2) Antimony trioxide "PATOX-M (trade name)" from Nihon Seiko Co., Ltd.
Coating Material for Anchor Coat:
(AC-1) A coating material for anchor coat prepared by diluting 3-aminopropyl triethoxysilane, "KBE-903 (trade name)" from Shin-Etsu Chemical Co., Ltd. in a denatured alcohol solvent, "a mixed solvent of ethanol/isopropyl alcohol/methanol=80/20/1 (volume ratio)" such that the solid concentration is 1% by mass.
(AC-2) A coating material for anchor coat prepared by diluting a modified olefin resin varnish, "XP012 (trade name)" from Mitsui Chemicals, Inc. in methyl ethyl ketone such that the solid concentration is 20% by mass.
(AC-3) A coating material for anchor coat prepared by diluting 3-glycidoxypropyltriethoxysilane, "KBE-403 (trade name)" from Shin-Etsu Chemical Co., Ltd. in a denatured alcohol solvent, "a mixed solvent of ethanol/isopropyl alcohol/methanol=80/20/1 (volume ratio)" such that the solid concentration is 1% by mass.
(AC-4) A coating material for anchor coat prepared by diluting 3-methacryloxypropyltriethoxysilane, "KBE-503 (trade name)" from Shin-Etsu Chemical Co., Ltd. in a denatured alcohol solvent, "a mixed solvent of ethanol/isopropyl alcohol/methanol=80/20/1 (volume ratio)" such that the solid concentration is 1% by mass.

Example 1

An adhesive resin composition that contains 35 parts by mass of the above (A-1), 55 parts by mass of the above (B-1), 10 parts by mass of the above (C-1), 60 parts by mass of the above (D-1), and 20 parts by mass of the above (D-2) was obtained by melt-kneading under the conditions of a die outlet resin temperature of 210° C. by using a co-rotating twin screw extruder. An adhesive resin composition film with a thickness of 50 μm was formed using the above-obtained adhesive resin composition by using a film forming apparatus equipped with a 700 mm wide T die, an extruder, and a winder with a nip system under the conditions of a die outlet resin temperature of 210° C. Next, the above (AC-1) was applied onto one side of a biaxially oriented polyethylene terephthalate-based resin film with a thickness of 25 μm by using a coating apparatus with a film Meyer bar system such that the dry film thickness was 0.01 μm, thereby forming an anchor coat. Subsequently, the above adhesive resin composition film was stacked on the anchor coat-formed side of the above biaxially oriented polyethylene terephthalate-based resin film; and the resultant was subjected to thermal lamination by using a pressure roll preheated to a temperature of 190° C. and a backing roll preheated to a temperature of 190° C. under the conditions of a pressure of 0.3 MPa and a speed of 1.0 m/min, thereby obtaining a laminate. The above tests (a) to (j) were carried out. The results are shown in Table 1.

Examples 2 to 17 and Examples 1C and 3C to 5C

A laminate was obtained in the exact same manner as described in Example 1 except that the composition of the adhesive resin composition was altered as shown in any one of Tables 1 to 4. The above tests (a) to (l) were carried out. The results are shown in any one of Tables 1 to 4.

Example 2C

An adhesive resin composition was obtained in the exact same manner as described in Example 1 except that the composition of the adhesive resin composition was altered as shown in Table 1. An attempt to form a film in the exact same manner as described in Example 1 was made; but no films were able to be obtained. Because of this, the subsequent evaluation was omitted.

Example 18

A laminate was obtained in the exact same manner as described in Example 1 except that the above (AC-2) was used as a coating material for anchor coat and the dry film thickness was altered to 2.0 μm. The above tests (a) to (l) were carried out. The results are shown in Table 4.

Example 19

A laminate was obtained in the exact same manner as described in Example 1 except that the above (AC-3) was used as a coating material for anchor coat. The above tests (a) to (l) were carried out. The results are shown in Table 4.

Example 1S

A laminate was obtained in the exact same manner as described in Example 1 except that the above (AC-4) was used as a coating material for anchor coat. The above tests (a) to (l) were carried out. The results are shown in Table 4.

TABLE 1

|  |  | Example 1 | Example 2 | Example 3 | Example 4 | Example 1C | Example 2C |
|---|---|---|---|---|---|---|---|
| Composition (parts by mass) | (A-1) | 35 | 40 | 30 | 20 | 15 | 75 |
|  | (A-2) |  |  |  |  |  |  |
|  | (A-3) |  |  |  |  |  |  |
|  | (B-1) | 55 | 55 | 55 | 55 | 55 | 15 |
|  | (C-1) | 10 | 5 | 15 | 25 | 30 | 10 |
|  | (D-1) | 60 | 60 | 60 | 60 | 60 | 60 |
|  | (D-2) | 20 | 20 | 20 | 20 | 20 | 20 |
| Coating material for anchor coat |  | AC-1 | AC-1 | AC-1 | AC-1 | AC-1 | — |
| Thickness of anchor coat μm |  | 0.01 | 0.01 | 0.01 | 0.01 | 0.01 | — |
| Evaluation results | Film-forming properties | ⊚ | ○ | ⊚ | ⊚ | ⊚ | X |
|  | Adhesion force 1N/mm | 2.5 | 2.2 | 2.0 | 2.0 | 1.5 | — |
|  | Adhesion force 2N/mm | 3.0 | 2.2 | 2.0 | 2.0 | 1.5 | — |
|  | Adhesion force 3N/mm | 2.5 | 2.2 | 2.0 | 2.0 | 1.5 | — |
|  | Adhesion force 4N/10 mm | Material failure | Material failure | 25 | 25 | 20 | — |
|  | Adhesion force 5N/10 mm | Material failure | Material failure | 20 | 20 | 18 | — |
|  | Adhesion force 6N/10 mm | Material failure | Material failure | 20 | 20 | 18 | — |
|  | Flame retardance | Conformed | Conformed | Conformed | Conformed | Conformed | — |
|  | Thermal resistance | ○ | ○ | ○ | Δ | X | — |
|  | Moist heat resistance | ○ | ○ | ○ | ○ | ○ | — |
|  | Heat cycle resistance | ○ | Δ | ○ | ○ | X | — |
|  | Cold resistance | ○ | Δ | ○ | ○ | ○ | — |

TABLE 2

|  |  | Example 5 | Example 6 | Example 7 | Example 8 | Example 9 | Example 3C |
|---|---|---|---|---|---|---|---|
| Composition (parts by mass) | (A-1) | 65 | 50 | 40 | 30 | 25 | 10 |
|  | (A-2) |  |  |  |  |  |  |
|  | (A-3) |  |  |  |  |  |  |
|  | (B-1) | 25 | 40 | 50 | 60 | 65 | 80 |
|  | (C-1) | 10 | 10 | 10 | 10 | 10 | 10 |
|  | (D-1) | 60 | 60 | 60 | 60 | 60 | 60 |
|  | (D-2) | 20 | 20 | 20 | 20 | 20 | 20 |
| Coating material for anchor coat |  | AC-1 | AC-1 | AC-1 | AC-1 | AC-1 | AC-1 |
| Thickness of anchor coat μm |  | 0.01 | 0.01 | 0.01 | 0.01 | 0.01 | 0.01 |
| Evaluation results | Film-forming properties | ○ | ○ | ⊚ | ○ | ⊚ | ⊚ |
|  | Adhesion force 1N/mm | 2.5 | 2.5 | 2.0 | 2.0 | 1.0 | 0.5 |
|  | Adhesion force 2N/mm | 2.5 | 2.5 | 2.0 | 2.0 | 1.0 | 0.5 |
|  | Adhesion force 3N/mm | 2.5 | 2.5 | 2.0 | 2.0 | 1.0 | 0.5 |
|  | Adhesion force 4N/10 mm | Material failure | Material failure | Material failure | 25 | PET | PET |
|  | Adhesion force 5N/10 mm | Material failure | Material failure | Material failure | 20 | PET | PET |
|  | Adhesion force 6N/10 mm | Material failure | Material failure | Material failure | 20 | PET | PET |
|  | Flame retardance | Conformed | Conformed | Conformed | Conformed | Conformed | Conformed |
|  | Thermal resistance | ○ | ○ | ○ | ○ | ○ | ○ |
|  | Moist heat resistance | ○ | ○ | ○ | ○ | ○ | ○ |
|  | Heat cycle resistance | ○ | ○ | ○ | ○ | Δ | Δ |
|  | Cold resistance | ○ | ○ | ○ | ○ | Δ | Δ |

TABLE 3

|  |  | Example 4C | Example 10 | Example 11 | Example 5C | Example 12 | Example 13 |
|---|---|---|---|---|---|---|---|
| Composition (parts by mass) | (A-1) | 35 | 35 | 35 | 35 |  |  |
|  | (A-2) |  |  |  |  | 35 |  |
|  | (A-3) |  |  |  |  |  | 35 |

TABLE 3-continued

|  |  | Example 4C | Example 10 | Example 11 | Example 5C | Example 12 | Example 13 |
|---|---|---|---|---|---|---|---|
|  | (B-1) | 60 | 60 | 40 | 35 | 55 | 55 |
|  | (C-1) | 0 | 5 | 25 | 30 | 10 | 10 |
|  | (D-1) | 60 | 60 | 60 | 60 | 60 | 60 |
|  | (D-2) | 20 | 20 | 20 | 20 | 20 | 20 |
| Coating material for anchor coat | | AC-1 | AC-1 | AC-1 | AC-1 | AC-1 | AC-1 |
| Thickness of anchor coat μm | | 0.01 | 0.01 | 0.01 | 0.01 | 0.01 | 0.01 |
| Evaluation results | Film-forming properties | ○ | ○ | ○○ | ○○ | ○ | ○○ |
|  | Adhesion force 1N/mm | 2.5 | 2.0 | 2.0 | 2.0 | 2.0 | 1.0 |
|  | Adhesion force 2N/mm | 2.5 | 2.0 | 2.0 | 2.0 | 2.0 | 1.0 |
|  | Adhesion force 3N/mm | 2.5 | 2.0 | 2.0 | 2.0 | 2.0 | 1.0 |
|  | Adhesion force 4N/10 mm | Material failure | Material failure | 25 | 25 | Material failure | Material failure |
|  | Adhesion force 5N/10 mm | Material failure | Material failure | 20 | 20 | Material failure | Material failure |
|  | Adhesion force 6N/10 mm | Material failure | Material failure | 20 | 20 | Material failure | Material failure |
|  | Flame retardance | Conformed | Conformed | Conformed | Conformed | Conformed | Conformed |
|  | Thermal resistance | ○ | ○ | Δ | X | ○ | Δ |
|  | Moist heat resistance | ○ | ○ | ○ | ○ | ○ | ○ |
|  | Heat cycle resistance | X | Δ | Δ | X | ○ | Δ |
|  | Cold resistance | X | Δ | ○ | ○ | ○ | ○ |

TABLE 4

|  |  | Example 14 | Example 15 | Example 16 | Example 17 | Example 18 | Example 19 | Example 1S |
|---|---|---|---|---|---|---|---|---|
| Composition (parts by mass) | (A-1) | 35 | 35 | 35 | 35 | 35 | 35 | 35 |
|  | (B-1) | 55 | 55 | 55 | 55 | 55 | 55 | 55 |
|  | (C-1) |  |  |  |  | 10 | 10 | 10 |
|  | (C-2) | 10 |  |  |  |  |  |  |
|  | (C-3) |  | 10 |  |  |  |  |  |
|  | (C-4) |  |  | 10 |  |  |  |  |
|  | (C-5) |  |  |  | 10 |  |  |  |
|  | (D-1) | 60 | 60 | 60 | 60 | 60 | 60 | 60 |
|  | (D-2) | 20 | 20 | 20 | 20 | 20 | 20 | 20 |
| Coating material for anchor coat | | AC-1 | AC-1 | AC-1 | AC-1 | AC-2 | AC-3 | AC-4 |
| Thickness of anchor coat μm | | 0.01 | 0.01 | 0.01 | 0.01 | 0.01 | 0.01 | 0.01 |
| Evaluation results | Film-forming properties | ○ | ○ | ○○ | ○ | ○○ | ○○ | ○○ |
|  | Adhesion force 1N/mm | 2.0 | 2.5 | 2.0 | 2.0 | 2.5 | 2.5 | 2.5 |
|  | Adhesion force 2N/mm | 2.0 | 2.5 | 2.0 | 2.0 | 3.0 | 3.0 | 2.5 |
|  | Adhesion force 3N/mm | 2.0 | 2.5 | 2.0 | 2.0 | 2.5 | 2.5 | 2.5 |
|  | Adhesion force 4N/10 mm | Material failure | Material failure | Material failure | Material failure | Material failure | Material failure | PET |
|  | Adhesion force 5N/10 mm | Material failure | Material failure | Material failure | Material failure | Material failure | Material failure | PET |
|  | Adhesion force 6N/10 mm | Material failure | Material failure | Material failure | Material failure | Material failure | Material failure | PET |
|  | Flame retardance | Conformed | Conformed | Conformed | Conformed | Conformed | Conformed | Conformed |
|  | Thermal resistance | ○ | ○ | ○ | ○ | ○ | ○ | X |
|  | Moist heat resistance | ○ | ○ | ○ | ○ | ○ | ○ | X |
|  | Heat cycle resistance | ○ | ○ | ○ | ○ | ○ | ○ | X |
|  | Cold resistance | ○ | ○ | ○ | ○ | ○ | ○ | X |

The adhesive resin composition of the present invention has good film-forming properties, exhibits excellent moist heat resistance, and is able to retain its adhesive properties to a conductor even when exposed to an environment of high temperature and high humidity for a long period of time. In addition, the adhesive resin composition of the present invention is able to earn UL certification for having a temperature rating of 125° C. without any steps of cross-linking.

DESCRIPTION OF SYMBOLS

1: Adhesive resin composition layer
2: Anchor coat
3: Biaxially oriented polyethylene terephthalate-based resin film layer
4: Tin plated annealed copper wire

The invention claimed is:

1. A flexible flat cable comprising one or more layers formed of an adhesive resin composition, the adhesive resin composition comprising:
   (A) 20 to 70% by mass of an acid-modified polypropylene-based resin;
   (B) 20 to 60% by mass of a polypropylene-based resin; and
   (C) 2 to 25% by mass of a copolymer of ethylene and one or more comonomers selected from the group consisting of vinyl acetate, alkyl methacrylate, and alkyl acrylate;
   with the proviso that the sum of the percentages of the component (A), the component (B), and the component (C) is 100% by mass.

2. The flexible flat cable according to claim 1, further comprising 10 to 300 parts by mass of (D) a flame retardant with the sum of the percentages of the component (A), the component (B), and the component (C) being 100 parts by mass.

3. The flexible flat cable according to claim 1, further comprising: a biaxially oriented polyethylene terephthalate-based resin film; an anchor coat formed of a coating material comprising a silane coupling agent; and the layer formed of the adhesive resin composition according to claim 1 on one side of the resin film in the order thereof.

4. The flexible flat cable according to claim 3, wherein the silane coupling agent is selected from the group consisting of a silane coupling agent having an amino group and a silane coupling agent having an epoxy group.

5. The flexible flat cable according to claim 2, the flame retardant (D) is at least one selected from the group consisting of antimony-based flame retardants, halogenated flame retardants, zinc-based flame retardants, phosphorus-based flame retardants, and nitrogen-containing compound-based flame retardants.

6. The flexible flat cable according to claim 3, further comprising at least one flame retardant (D) selected from the group consisting of antimony-based flame retardants, halogenated flame retardants, zinc-based flame retardants, phosphorus-based flame retardants, and nitrogen-containing compound-based flame retardants.

7. The flexible flat cable according to claim 4, further comprising at least one flame retardant (D) selected from the group consisting of antimony-based flame retardants, halogenated flame retardants, zinc-based flame retardants, phosphorus-based flame retardants, and nitrogen-containing compound-based flame retardants.

* * * * *